US008646726B2

(12) United States Patent
Manzanares

(10) Patent No.: US 8,646,726 B2
(45) Date of Patent: Feb. 11, 2014

(54) METHOD AND APPARATUS FOR DETERMINING THE APPARENT OPERATIONAL INTEGRITY OF A NO-BACK DEVICE

(75) Inventor: David J Manzanares, Salt Lake City, UT (US)

(73) Assignee: Moog Inc., East Aurora, NY (US)

( * ) Notice: Subject to any disclaimer, the term of this patent is extended or adjusted under 35 U.S.C. 154(b) by 559 days.

(21) Appl. No.: 12/997,694

(22) PCT Filed: Jun. 13, 2008

(86) PCT No.: PCT/US2008/007434
§ 371 (c)(1),
(2), (4) Date: Dec. 13, 2010

(87) PCT Pub. No.: WO2009/151423
PCT Pub. Date: Dec. 17, 2009

(65) Prior Publication Data
US 2011/0094848 A1    Apr. 28, 2011

(51) Int. Cl.
*B64C 5/10*    (2006.01)
(52) U.S. Cl.
USPC ..................... 244/99.2; 192/233; 192/223.1
(58) Field of Classification Search
USPC .......... 244/99.2, 99.3, 99.13, 99.14; 192/223, 192/223.1; 73/761, 802
See application file for complete search history.

(56) References Cited

U.S. PATENT DOCUMENTS

| | | | | |
|---|---|---|---|---|
| 3,583,248 A * | 6/1971 | Langenberg | ................. | 74/89.39 |
| 3,630,329 A * | 12/1971 | Nelson | ........................... | 192/223 |
| 4,459,867 A * | 7/1984 | Jones | ........................... | 74/89.38 |
| 4,697,672 A * | 10/1987 | Linton | ........................... | 188/134 |
| 5,299,666 A * | 4/1994 | Lang et al. | ..................... | 188/134 |
| 5,582,390 A * | 12/1996 | Russ | ........................... | 244/99.2 |
| 5,655,636 A * | 8/1997 | Lang et al. | ..................... | 192/223 |
| 5,944,148 A * | 8/1999 | Bae et al. | ....................... | 188/134 |
| 6,109,415 A * | 8/2000 | Morgan et al. | ............ | 192/223.1 |
| 6,467,363 B2 * | 10/2002 | Manzanares et al. | ........ | 74/89.39 |
| 6,631,797 B2 * | 10/2003 | Capewell | ...................... | 192/223 |
| 6,719,106 B1 * | 4/2004 | Gardner | ........................ | 188/134 |

(Continued)

*Primary Examiner* — Christopher P Ellis
*Assistant Examiner* — Medhat Badawi
(74) *Attorney, Agent, or Firm* — Phillips Lytle LLP

(57) ABSTRACT

This invention provides an improvement in a no-back device having a ball screw connected to a variable load of reversible polarity (±L) and having a portion penetrating a housing. The device includes a braking mechanism acting between the housing and the ball screw for producing a force that resists movement of the ball screw in the direction of an "aiding" load, but does not substantially resist movement of the ball screw in the direction of an "opposing" load. The improvement broadly includes: a first spring acting between the housing and the braking mechanism for exerting a first preload force (F1) on the braking mechanism for simulating the application of an external load on the ball screw in one of the directions; whereby the apparent operational integrity of the no-back device may be checked when no external load is applied to the ball screw. In use, the apparatus performs the steps of: providing a first spring; causing the first spring to exert a first preload force (F1) on the braking mechanism; determining the actual torque (Ta) required to move the ball screw while the aircraft is on the ground; comparing the actual torque with a theoretical torque (Tt) required to move the ball screw; and inferring that the no-back device is not operating correctly if the actual torque is less than the theoretical torque; thereby to test the apparent operational integrity of the no-back device when the aircraft is on the ground.

8 Claims, 2 Drawing Sheets

(56) References Cited

U.S. PATENT DOCUMENTS

| | | | |
|---|---|---|---|
| 6,722,485 B1* | 4/2004 | Gitnes et al. | 192/223.1 |
| 6,827,183 B1* | 12/2004 | Polcuch | 188/134 |
| 6,997,297 B2* | 2/2006 | Bartley et al. | 192/45.006 |
| 7,690,597 B2* | 4/2010 | Cavalier et al. | 244/99.2 |
| 7,866,602 B2* | 1/2011 | Port-Robach et al. | 244/99.4 |
| 7,954,756 B2* | 6/2011 | Cavalier et al. | 244/99.2 |
| 8,393,568 B2* | 3/2013 | Maresko et al. | 244/99.2 |
| 2002/0104394 A1* | 8/2002 | Manzanares et al. | 74/89.26 |
| 2004/0200929 A1* | 10/2004 | Perni et al. | 244/75 R |
| 2006/0065778 A1* | 3/2006 | Kannapell | 244/99.2 |
| 2007/0051847 A1* | 3/2007 | Quitmeyer et al. | 244/99.2 |
| 2008/0000730 A1* | 1/2008 | Port-Robach et al. | 188/71.2 |
| 2008/0116317 A1* | 5/2008 | Steinberg | 244/99.3 |
| 2008/0203221 A1* | 8/2008 | Flatt | 244/99.2 |
| 2010/0065679 A1* | 3/2010 | Clingman et al. | 244/99.3 |
| 2010/0096498 A1* | 4/2010 | McKay | 244/99.2 |
| 2011/0006154 A1* | 1/2011 | Maresko et al. | 244/99.2 |

* cited by examiner

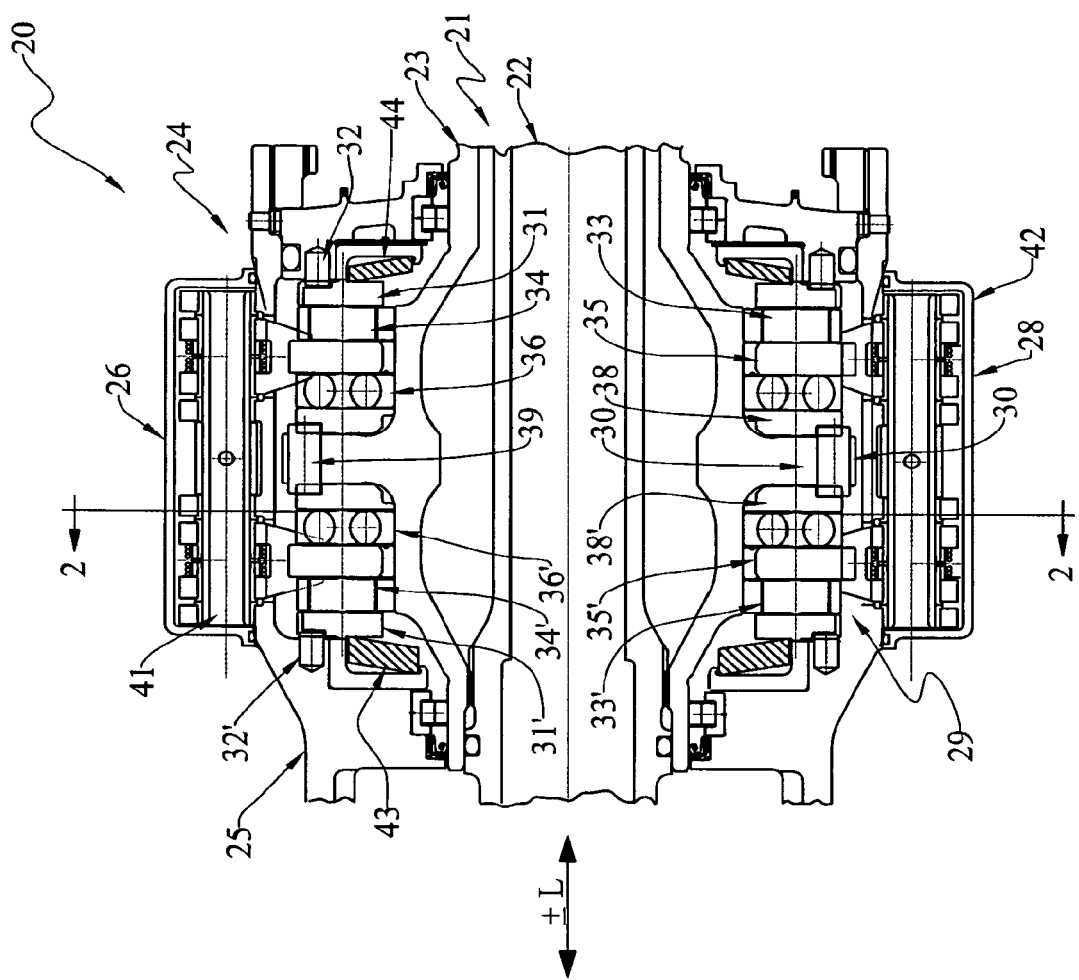
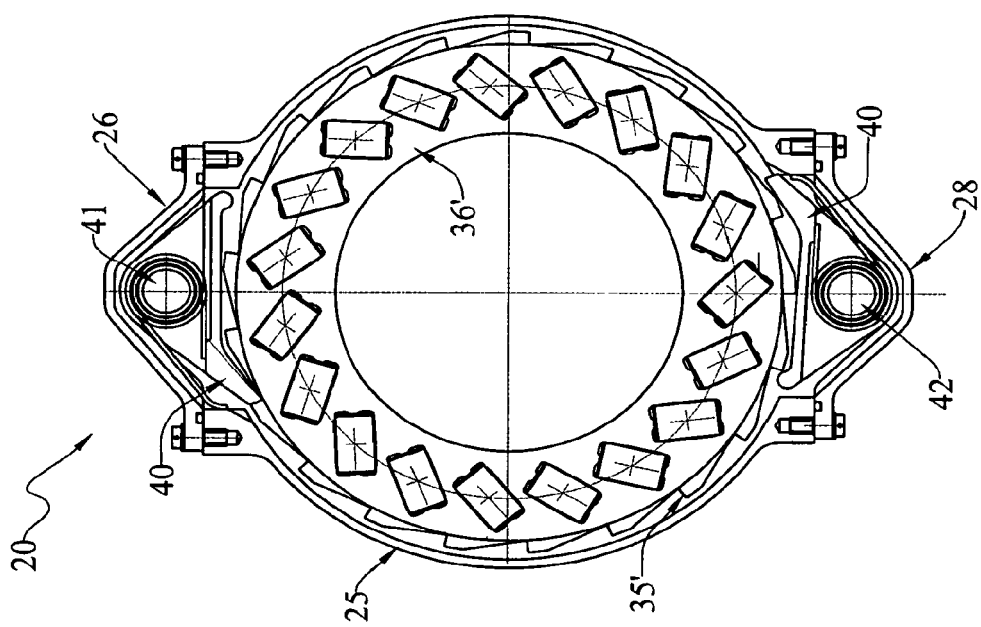

METHOD AND APPARATUS FOR DETERMINING THE APPARENT OPERATIONAL INTEGRITY OF A NO-BACK DEVICE

CROSS-REFERENCE TO RELATED PATENT APPLICATIONS

The present application is the National Stage of International Application No. PCT/US2008/007434 filed Jun. 13, 2008.

TECHNICAL FIELD

The present invention relates generally to the field of no-back devices for preventing the unintended rotation of a ball screw that is subjected to an "aiding" load, and, more particularly, to an improved method and apparatus for determining the operational integrity of a no-back device used in connection with a ball screw that is used to controllably displace an airfoil surface (e.g., a trim tab).

BACKGROUND ART

Ball screws are in common use today for a variety of applications. One such application is to control the displacement of an airfoil surface, such as a trim tab. In such application, a drive mechanism is mounted on the aircraft, and is used to selectively rotate a ball screw in the appropriate angular direction. A nut is threadedly mounted on the ball screw, and is arranged to engage the airfoil surface at an eccentric location. Thus, the motor may selectively rotate the ball screw relative to a nut in one angular direction to cause the airfoil surface to move or pivot in one direction, and may selectively rotate the ball screw in the opposite angular direction relative to the nut to cause the airfoil surface to move or pivot in the opposite direction.

No-back devices are used with such mechanisms to provide a force that resists rotation of the ball screw in a direction that would result in movement of the airfoil surface in the direction of the applied aerodynamic force (i.e., an "aiding" load), while applying little or no force resisting rotation of the ball screw in the direction that would result in movement of the airfoil surface against the applied aerodynamic force (i.e., an "opposing" load). As used herein, a ball screw refers to the screw and the nut threaded thereon. The screw may be rotated relative to the nut, or the nut may be rotated relative to the screw, as desired.

One example of such a no-back device is shown and described in U.S. Pat. No. 6,109,415, the aggregate disclosure of which is hereby incorporated by reference.

Such aircraft applications typically require that the airfoil surface be placed in a slip stream before an "aiding" or "opposing" load may be applied to the ball screw.

It would be generally desirable to be able to check the apparent operational integrity of such a no-back device while the aircraft is on the ground and while the airfoil surface is unloaded.

Details of other no-back devices are shown and described in U.S. Pat. Nos. 6,631,791 B2 and 7,672,540 B1, the aggregate disclosures of which are hereby incorporated by reference.

DISCLOSURE OF THE INVENTION

With parenthetical reference to the corresponding parts, portions or surfaces of the disclosed embodiment, merely for purposes of illustration and not by way of limitation, the present invention broadly provides an improved method and apparatus for determining the operational integrity of a no-back device (20).

In one aspect, the invention provides an improvement in a no-back device having a ball screw (21) connected to a variable load of reversible polarity (±L) and having a portion penetrating a housing, the device including a braking mechanism (29) acting between the housing and the ball screw for producing a force that resists movement of the ball screw in the direction of an "aiding" load, but does not substantially resist movement of the ball screw in the direction of an "opposing" load. The improvement broadly includes: a first spring (43) acting between the housing and the braking mechanism for exerting a first preload force (F1) on the braking mechanism for simulating the application of an external load on the ball screw in one of the directions; whereby the apparent operational integrity of the no-back device may be checked when no external load is applied to the ball screw.

The improvement may further include a second spring (44) acting between the housing and the braking mechanism for exerting a second preload force (F2) on the braking mechanism for simulating the application of an external load on the ball screw in the other of the directions.

One of the preload forces is greater than the other of the preload forces.

The no-back device may be mounted on an aircraft (45). The aircraft may have an airfoil surface (46) arranged to exert a force on the ball screw. The first preload force allows the apparent operational integrity of the no-back device to be checked when the aircraft is on the ground.

One of the "aiding" and "opposing" loads may exert a tensile force on the no-back device, and the other of the "aiding" and "opposing" loads may exert a compressive force on the braking mechanism of the no-back device.

The first preload force requires that a threshold torque be applied to the ball screw to move the ball screw. The operational integrity of the no-back device may be determined as a function of the actual torque required to move the ball screw and the threshold torque.

An electric motor (48) may be used to selectively rotate the ball screw in the appropriate direction, and the operational integrity of the no-back device may be determined as a function of whether the actual motor current required to move the ball screw and the motor current theoretically required to move the ball screw.

In another aspect, the invention provides an improved method of testing the apparent operational integrity of a no-back device (20) mounted on an aircraft (45) and used to prevent unintended rotation of a ball screw (21) connected to an airfoil surface (46), the no-back device having a braking mechanism (29) acting between the aircraft and the ball screw for producing a force that resists movement of the ball screw in the direction of an "aiding" load but does not substantially resist movement of the ball screw in the direction of an "opposing" load. This method includes the steps of: providing a first spring (43); causing the first spring to exert a first preload force (F1) on the braking mechanism; determining the actual torque (Ta) required to move the ball screw while the aircraft is on the ground; comparing the actual torque with a theoretical torque (Tt) required to move the ball screw; and inferring that the no-back device is not operating correctly if the actual torque is less than the theoretical torque; thereby to test the apparent operational integrity of the no-back device when the aircraft is on the ground.

Accordingly, the general object of the invention is to provide improved methods and apparatuses for testing or inferring the operational integrity of a no-back device.

These and other objects and advantages will become apparent from the foregoing and ongoing written specification, the drawings and the appended claims.

BRIEF DESCRIPTION OF THE DRAWINGS

FIG. 1 is a fragmentary longitudinal vertical view, partly in section and partly in elevation, of the improved no-back device, showing the first and second preload springs acting between the housing and the braking mechanism.

FIG. 2 is fragmentary transverse vertical outline view, this view taken generally on line 2-2 of FIG. 1, with the ball screw removed.

DESCRIPTION OF THE PREFERRED EMBODIMENTS

Figure 3:
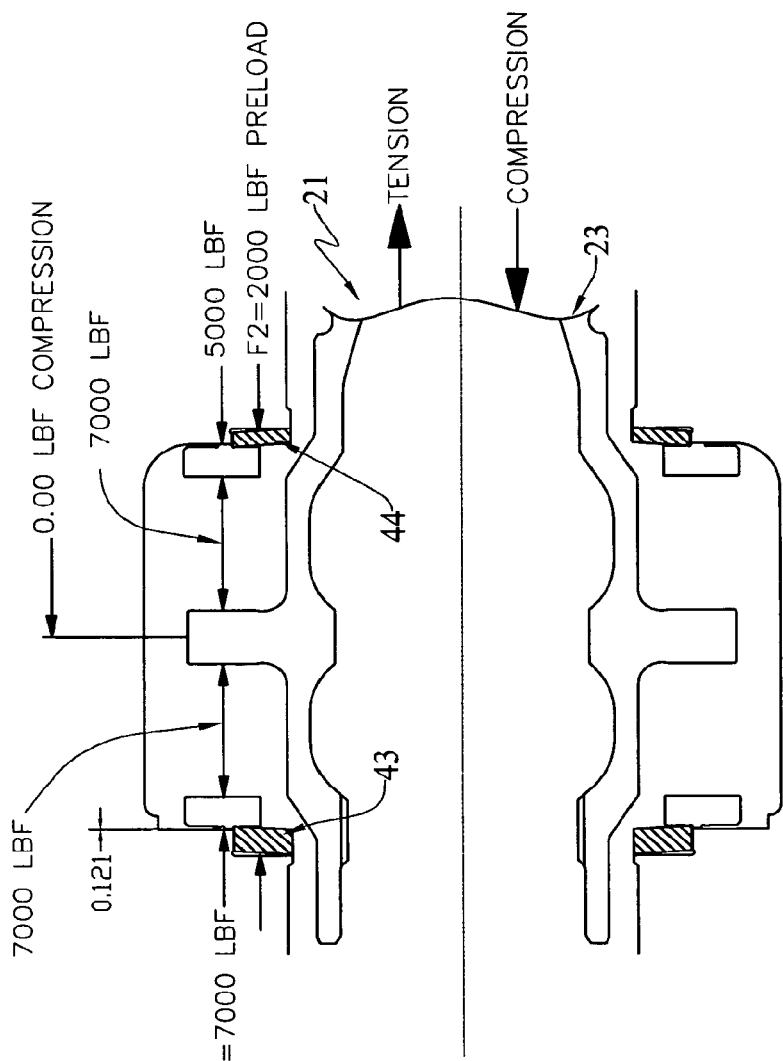
FIG. 3 is a fragmentary schematic view showing the various forces acting on the braking mechanism.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly to FIGS. 1 and 2 thereof, the present invention provides an improvement in a no-back device, generally indicated at 20. The no-back device is shown as having a ball screw, generally indicated at 21, which consists of an inner part 22 (i.e., a tie rod) and an outer part 23 fixedly connected to the inner part. The ball screw is connected to a load of reversible polarity (±L), and has a portion, shown in FIG. 1, as penetrating a housing 24. The housing is shown as being an assembly of various parts including a central part 25, an upper part 26, and a lower part 28.

A braking mechanism, generally indicated at 29, is operatively arranged to act between the housing and the ball screw for exerting a force that resists movement of the ball screw in the direction of an "aiding" load, but does not substantially resist movement of the ball screw in the direction of an "opposing" load. This braking mechanism 29 is shown as including two different subassemblies that act on an annular flange 30 that extends radially outwardly from the ball screw outer part. The rightward part of the braking mechanism is shown as including an annular thrust end plate 31 that bears against the housing and is restrained from rotating relative thereto by an anti-rotation pin 32, an annular thrust bearing 33, 34, an annular ratchet plate 35, an annular brake ring 36, and another annular member 38 that bears against the ball screw flange 30 and is prevented from rotating relative thereto by an anti-rotation pin 39. The left part of the brake assembly is a mirror image of the right part. Hence, the same reference numerals primed have been used to identify the corresponding parts, portions, or surfaces of the left part of the brake mechanism.

As best shown in FIG. 2, pawls 40, 40 are mounted on the housing and are operatively arranged to engage ratchet wheel 35'. These pawls are mounted for rotation on pins 41, 42, and are spring biased to engage the approximate ratchet wheel. The teeth of ratchet wheel 35 point in one angular direction, and the teeth of ratchet wheel 35' point in the opposite angular direction. Hence, the pawls associated with on ratchet wheel are arranged to permit motion in one direction but to resist motion in the other, although the two axially-spaced sets of pawls are reversed because the direction of the ratchet wheels is reversed.

This much of the invention is generally taught and described in U.S. Pat. No. 6,109,105.

The improvement provides a first spring 43 acting between the housing and the breaking mechanism for exerting a first preload force (F1) on the braking mechanism for simulating the application of an external load on the ball screw in one of the directions such that the operational integrity of the no-back device may be checked when no external load is applied to the ball screw. The improvement may further include a second spring 44 acting between the housing and the braking mechanism for exerting a second preload force (F2) on the braking mechanism for simulating the application of an external load on the ball screw in the other of the directions. In the preferred embodiment, the first and second preload springs 43, 44 are Belleville springs, that are arranged to act between the housing and the braking mechanism, and that are arranged to oppose one another.

The force (F1) exerted by spring 43 may be greater than the opposing force (F2) exerted by spring 44. As best shown in FIG. 3, the first spring 43 may be arranged to exert a rightward force of, say, 7,000 pounds on the braking mechanism, whereas the second spring 44 may be arranged to exert a leftward force of, say, 2,000 pounds on the braking mechanism.

Figure 4:
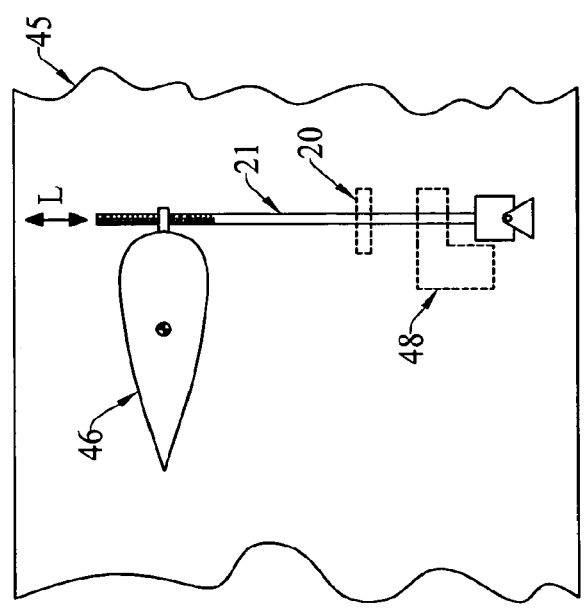
FIG. 4 is a schematic view showing the no-back device as being operatively installed on a ball screw acting between an airfoil surface and the fuselage of an aircraft.

As shown in FIG. 4, the no-back device is adapted to be mounted on an aircraft 45. Such aircraft may have an intermediately-pivoted airfoil surface 46 arranged to exert a force on the ball screw. The ball screw is selectively rotated in the appropriate angular direction by a driving device, such as an electric motor. The first preload force, with or without the second preload force, allows the operational integrity of the no-back device to be checked when the aircraft is on the ground.

One of the "aiding" and "opposing" loads exerts a tensile force on the braking mechanism, and the other of the "aiding" and "opposing" loads exerts a compressive force on the braking mechanism. The first preload force requires that a threshold torque be applied to the ball screw to move the ball screw. The operational integrity of the no-back device may be determined as a function of the actual torque required to move the ball screw and the threshold torque. In one form, a defect or error is sensed if the actual force needed to move the ball screw is less than the threshold force.

In yet another embodiment, an electric motor is used to selectively rotate the ball screw in the appropriate direction. The theoretical motor current required to move the ball screw is known. The operational integrity of the no-back device may be determined as a function of the actual motor current required to move the ball screw and the theoretical motor current required to move the ball screw. Here again, a failure or defect may be noted if the actual motion current required to move the ball screw is less than the theoretical motor current.

In another aspect, the invention provides an improved method of testing the operational integrity of a no-back device mounted on an aircraft and used to prevent unintended rotation of a ball screw connected to an airfoil surface. The no-back device has a braking mechanism acting between the aircraft and the ball screw for producing a force that resists movement of the ball screw in the direction of an "aiding" load but does not substantially resist movement of the ball screw in the direction of an "opposing" load. This method broadly comprises the steps of providing a first spring; causing the first spring to exert a first preload force on the braking mechanism; determining the actual torque required to move the ball screw while the aircraft is on the ground; comparing the actual torque with the theoretical torque required to move the ball screw; and inferring that the no-back device is not operating correctly if the actual torque is less than the theoretical torque; thereby to test the operational integrity of the no-back device when the aircraft is on the ground.

Modifications

The present invention specifically contemplates that many changes and additions may be made. For example, the structure and configuration of the ball screw may be readily changed, as necessary. In the form illustrated, the ball screw as an inner part 22 and an outer part 23 that are constrained to rotate together by virtue of a splined connection therebetween. Other types of ball screws might be used. For example, U.S. Pat. No. 6,109,415 shows another configuration of ball screw having an outwardly-extending radial flange and a braking mechanism acting between the housing and this ball screw.

Similarly, the structure and configuration of the housing may be changed as desired.

In the preferred embodiment, braking rings containing skewed rollers are operatively arranged as portions of the braking mechanism. This need not invariably obtain, and such braking rings may be changed or modified, or omitted all together, as desired.

Therefore, while the presently-preferred form of the improved no-back device has been shown and described, and several modifications thereof discussed, persons skilled in this art will readily appreciate that various additional changes and modifications may be made without departing from the spirit of the invention, as defined and differentiated by the following claims.

What is claimed is:

1. In a no-back device having a ball screw connected to a variable load of reversible polarity and having a portion penetrating a housing, said device including a braking mechanism acting between said housing and said ball screw for producing a force that resists movement of said ball screw in the direction of an "aiding" load but does not substantially resist movement of said ball screw in the direction of an "opposing" load, the improvement comprising:
a first spring acting between said housing and said braking mechanism for exerting a first preload force on said braking mechanism for simulating the application of an external load on said ball screw in one of said directions;
whereby the apparent operational integrity of said no-back device may be checked when no external load is applied to said ball screw.

2. The improvement as set forth in claim 1, and further comprising:
a second spring acting between said housing and said braking mechanism for exerting a second preload force on said braking mechanism for simulating the application of an external load on said ball screw in the other of said directions.

3. The improvement as set forth in claim 2 wherein one of said preload forces is greater than the other of said preload forces.

4. The improvement as set forth in claim 1 wherein said no-back device is mounted on an aircraft, wherein said aircraft has an airfoil surface arranged to exert a force on said ball screw, and wherein said first preload force allows the operational integrity of said no-back device to be checked when said aircraft is on the ground.

5. The improvement as set forth in claim 1 wherein one of said "aiding" and "opposing" loads exerts a tensile force on said braking mechanism, and the other of said "aiding" and "opposing" loads exerts a compressive force on said braking mechanism.

6. The improvement as set forth in claim 1 wherein said first preload force requires that a threshold torque be applied to said ball screw to move said ball screw, and wherein the operational integrity of said no-back device is determined as a function of the actual torque required to move said ball screw and said threshold torque.

7. The improvement as set forth in claim 6 wherein said no-back an electric motor is used to selectively rotate said ball screw in the appropriate direction, wherein the theoretical motor current required to move said ball screw is known, and wherein the operational integrity of said no-back device is determined as a function of the actual motor current required to move said ball screw and said theoretical motor current.

8. The method of testing the operational integrity of a no-back device mounted on an aircraft and used to prevent unintended rotation of a ball screw connected to an airfoil surface, said no-back device having a braking mechanism acting between said aircraft and said ball screw for producing a force that resists movement of said ball screw in the direction of an "aiding" load but does not substantially resist movement of said ball screw in the direction of an "opposing" load, comprising the steps of:
providing a first spring;
causing said first spring to exert a first preload force on said braking mechanism;
determining the actual torque required to move said ball screw while said aircraft is on the ground;
comparing said actual torque with a theoretical torque required to move said ball screw; and
inferring that said no-back device is not operating correctly if said actual torque is less than said theoretical torque; thereby to test the apparent operational integrity of said no-back device when said aircraft is on the ground.

* * * * *